US012776836B2

(12) United States Patent
Wang et al.

(10) Patent No.: US 12,776,836 B2
(45) Date of Patent: Oct. 27, 2026

(54) OTN DIGITAL TWIN NETWORK GENERATION METHOD AND SYSTEM BASED ON LONGITUDINAL FEDERATED LEARNING

(71) Applicant: ZTE CORPORATION, Shenzhen (CN)

(72) Inventors: Dajiang Wang, Shenzhen (CN); Zhuoyao Huang, Shenzhen (CN); Qilei Wang, Shenzhen (CN); Hongyun Xiao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 200 days.

(21) Appl. No.: 18/849,574

(22) PCT Filed: Nov. 28, 2022

(86) PCT No.: PCT/CN2022/134719
§ 371 (c)(1),
(2) Date: Sep. 23, 2024

(87) PCT Pub. No.: WO2023/179073
PCT Pub. Date: Sep. 28, 2023

(65) Prior Publication Data

US 2025/0202575 A1 Jun. 19, 2025

(30) Foreign Application Priority Data

Mar. 23, 2022 (CN) ......................... 202210286945.9

(51) Int. Cl.
*H04B 10/079* (2013.01)
*G06N 3/044* (2023.01)
(Continued)

(52) U.S. Cl.
CPC ......... *H04B 10/0791* (2013.01); *G06N 3/044* (2023.01); *G06N 3/045* (2023.01); *G06N 3/098* (2013.01); *H04L 9/008* (2013.01)

(58) Field of Classification Search
CPC .... G06F 18/214; G06F 18/2415; G06F 18/27; G06N 3/044; G06N 3/045; G06N 3/047;
(Continued)

(56) References Cited

U.S. PATENT DOCUMENTS 9,590,964 B1 * 3/2017 Bortz .................... H04L 63/105
10,454,891 B2 * 10/2019 Burnett .................... H04L 63/02
(Continued)

FOREIGN PATENT DOCUMENTS

BR 102016011260 A2 * 12/2017 ......... H04L 63/0428
CN 105848140 A * 8/2016 ............ H04W 12/04
(Continued)

OTHER PUBLICATIONS

Zehui Zhang et al.,: "Adaptive Privacy-Preserving Federated Learning for Fault Diagnosis in Internet of Ships," Apr. 25, 2022, IEEE Internet of Things Journal, vol. 9, No. 9, May 1, 2022,pp. 6844-6850.*

(Continued)

*Primary Examiner* — Omar S Ismail
(74) *Attorney, Agent, or Firm* — Vivacqua Crane, PLLC

(57) ABSTRACT

In the present disclosure a method and a system for generating an Optical Transport Network (OTN) DT network based on vertical federated learning are disclosed. The method includes: performing homomorphic encryption on a local fault root cause identifier to obtain an encrypted fault root cause identifier; receiving all encrypted alarm sample sequences corresponding to the encrypted fault root cause identifier; generating a single-domain training set according to the encrypted fault root cause identifier and the encrypted
(Continued)

alarm sample sequences; training the local cross-domain fault root cause identification model according to the single-domain training set to obtain a model parameter update amount of the cross-domain fault root cause identification model; and reporting the model parameter update amount to the multi-domain orchestration system.

15 Claims, 5 Drawing Sheets

(51) Int. Cl.
*G06N 3/045* (2023.01)
*G06N 3/098* (2023.01)
*H04L 9/00* (2022.01)

(58) Field of Classification Search
CPC .......... G06N 3/048; G06N 3/09; G06N 3/098; G06N 5/01; G06N 5/02; G06N 5/04; G06N 7/02; G06N 7/04; G06N 3/12; G06N 3/02; G06N 3/004; G06N 3/04; G06N 3/06; G06N 3/08; G06N 3/10; G06N 5/022; G06N 5/046; G06N 3/063; G06N 3/067; H04B 10/0791; H04Q 11/00; H04L 41/0631; H04L 9/00; H04L 9/008; H04L 9/40
See application file for complete search history.

(56) References Cited

U.S. PATENT DOCUMENTS 10,511,582 B2 * 12/2019 Sarwar .................. H04L 63/062
10,511,629 B2 * 12/2019 Sarwar .................. H04L 9/0841
10,645,469 B1 * 5/2020 Byrne ....................... H04J 3/14
10,917,175 B2 * 2/2021 Jia ...................... H04B 10/2589
11,277,330 B1 * 3/2022 Davis ...................... H04L 45/04
2003/0091267 A1 * 5/2003 Alvarez ............. H04Q 11/0005 385/16
2004/0254892 A1 * 12/2004 Adamson ........... G06Q 20/1085 705/73
2009/0257746 A1 * 10/2009 Reina .................. H04J 14/0269 398/34
2009/0279551 A1 * 11/2009 Wong .................. H04L 41/0631 370/395.53
2010/0111307 A1 * 5/2010 Hu ........................ H04L 9/3271 380/277
2014/0044262 A1 * 2/2014 Loprieno .............. H04L 9/0637 380/256
2015/0055664 A1 * 2/2015 Kanonakis ............. H04Q 11/00 370/542
2015/0079931 A1 * 3/2015 Liu ..................... H04W 12/033 455/410
2016/0345179 A1 * 11/2016 Chen ..................... H04J 3/0661
2019/0392330 A1 * 12/2019 Martineau ................ G06N 5/04
2020/0067887 A1 * 2/2020 Sarwar ....................... H04L 9/16
2020/0099658 A1 * 3/2020 Couillard ................. G09C 1/00
2020/0296086 A1 * 9/2020 Gray ...................... H04L 9/3247
2021/0174243 A1 * 6/2021 Angel ..................... H04L 9/083
2021/0241050 A1 * 8/2021 Gunaratna ............... G06N 3/09
2021/0258665 A1 * 8/2021 Sadasivarao .......... H04L 9/3263
2021/0309224 A1 * 10/2021 Kondo ................ B60W 30/182
2022/0188649 A1 * 6/2022 Liu .......................... G06N 5/01
2023/0281517 A1 * 9/2023 Liu ......................... G06N 20/00 706/12
2023/0291640 A1 * 9/2023 Xie ...................... H04L 41/0631
2024/0119305 A1 * 4/2024 Ickin .................... G06N 3/0495

FOREIGN PATENT DOCUMENTS

CN 108092733 A * 5/2018 ......... H04Q 11/0062
CN 111737749 A * 10/2020 ............. G06N 3/045
CN 111897673 A * 11/2020 ......... G06F 18/2415
CN 113259148 A * 8/2021 ............ H04W 24/04
DE 60202558 T2 * 3/2006 ............... H04K 1/02
EP 1289332 A2 * 3/2003 .......... H04J 14/0287
EP 2854327 A1 * 4/2015 ............ H04B 10/27
EP 3389201 A1 * 10/2018 ................ H04J 3/14
RU 2843893 C1 * 7/2025
WO WO-2016000376 A1 * 1/2016 ............... H04L 9/40
WO WO-2021160686 A1 * 8/2021 ............. G06N 3/088
WO WO-2022083570 A1 * 4/2022 ........... H04L 1/0061

OTHER PUBLICATIONS

Haigin Wu et al.,"Privacy-Aware Task Allocation and Data Aggregation in Fog-Assisted Spatial Crowdsourcing," Mar. 5, 2020, IEEE Transactions on Network Science and Engineering, vol. 7, No. 1, Jan.-Mar. 2020,pp. 589-560.*
Parimala M, Swarna et al.,"Fusion of Federated Learning and Industrial Internet of Things: A Survey," Jan. 4, 2021,arXiv: 2101.00798v1,pp. 1-18.*
Md. Tarek Hasan et al.,"Data Privacy-Aware Machine Learning and Federated Learning: A Framework for Data Security," Sep. 24, 2021, American Journal of Interdisciplinary Studies, Sep. 2021,pp. 1-25.*
Dinh C. Nguyen et al.,"Federated Learning for Internet of Things: A Comprehensive Survey," Aug. 23, 2021,IEEE Communications Surveys & Tutorials, vol. 23, No. 3, Third Quarter 2021,pp. 1622-1645.*
Xiaoming Yuan et al.,"FedSTN: Graph Representation Driven Federated Learning for Edge Computing Enabled Urban Traffic Flow Prediction," Aug. 2, 2023, pp. 8738-8743.*
Chao He et al.,"Security and Privacy in Vehicular Digital Twin Networks: Challenges and Solutions," IEEE Wireless Communications, Aug. 2023,pp. 154-158.*
Jiehan Zhou et al.,"A Survey on Federated Learning and its Applications for Accelerating Industrial Internet," pp. 1-8.*
Owais Khalid et al.,"A review of data analytics techniques for effective management of big data using IoT," pp. 1-4.*
Wei Ou et al.,"A Homomorphic-encryption-based Vertical Federated Learning Scheme for Rick Management," Computer Science and Information Systems 17(3),pp. 819-828.*
Maheshbhai Kansara,"Cloud Migration Strategies and Challenges in Highly Regulated and Data-Intensive Industries: A Technical Perspective," Dec. 14, 2021,pp. 1-19.*
International Searching Authority. International Search Report and Written Opinion for PCT Application No. PCT/CN2022/134719 and English translation, mailed Feb. 14, 2023, pp. 1-10.
Li, J., et al. "Overview of federal learning and its application in telecom industry," Information and Communication Technology and Policy, No. 9, 2020, pp. 35-41.

* cited by examiner

OTN DIGITAL TWIN NETWORK GENERATION METHOD AND SYSTEM BASED ON LONGITUDINAL FEDERATED LEARNING

CROSS-REFERENCE TO RELATED APPLICATION

This application is a national stage filing under 35 U.S.C. § 371 of international application number PCT/CN2022/134719, filed Nov. 28, 2022, which claims priority to Chinese patent application No. 202210286945.9, filed Mar. 23, 2022. The contents of these applications are incorporated herein by reference in their entirety.

TECHNICAL FIELD

The present disclosure relates to the field of application of Digital Twin (DT) technologies, and in particular, to a method and system for generating an Optical Transport Network (OTN) DT network based on vertical federated learning.

BACKGROUND

Monitoring, analysis, prediction, diagnosis, training, and simulation can be performed based on DT, and the simulation result can be fed back to a physical object, to help with optimization and decision-making of the physical object. Related technologies involving DT model construction, real-time update of digital model status, simulation analysis, control, and decision-making based on digital twins, etc., can be collectively referred to as DT technologies.

The DT technologies can be applied in the telecommunications field to realize the analysis of the entire OTN. A DT network layer is a model abstraction of an entire cross-domain OTN physical network. The communication between DT network elements is not restricted by the physical network space, and the visibility and operability of DT network elements are not restricted by spatial restrictions and control restrictions such as physical network domains. Therefore, a functional model of the OTN DT network layer as the cross-domain OTN physical network needs to be capable of globally analyzing the entire cross-domain OTN physical network, and needs to be trained using sample data from various domains.

Generally, each single domain of the entire cross-domain OTN physical network has a large amount of training data to be collected and processed, and each single domain has privacy protection demands for alarms, network topology, user services, and other related data information which should not all be open and centralized for reporting. Therefore, how to enable each single-domain control system to collect complete training sample data of a cross-domain fault root cause identification model and implement training to enhance the generalization capability of model reasoning, and protect data privacy of each single domain has become a bottleneck in modeling of a DT functional model of the cross-domain OTN network, and needs to be solved urgently.

SUMMARY

The following is a summary of the subject matter set forth in this description. This summary is not intended to limit the scope of protection of the claims.

Embodiments of the present disclosure provide a method and system for generating an OTN DT network based on vertical federated learning.

In accordance with a first aspect of the present disclosure, an embodiment provides a method for generating an OTN DT network based on vertical federated learning, applied to any single-domain control system in an OTN multi-domain physical network system, where the OTN multi-domain physical network system further includes a multi-domain orchestration system, and a cross-domain fault root cause identification model of the multi-domain orchestration system and a cross-domain fault root cause identification model of the single-domain control system are of the same structure, the method including: performing homomorphic encryption on a local fault root cause identifier to obtain an encrypted fault root cause identifier; receiving all encrypted alarm sample sequences corresponding to the encrypted fault root cause identifier, where the encrypted alarm sample sequences are obtained through homomorphic encryption of related alarm information by the single-domain control system of a corresponding single domain; generating a single-domain training set according to the encrypted fault root cause identifier and the encrypted alarm sample sequences; training the local cross-domain fault root cause identification model according to the single-domain training set to obtain a model parameter update amount of the cross-domain fault root cause identification model; and reporting the model parameter update amount to the multi-domain orchestration system, such that the multi-domain orchestration system generates an OTN DT network based on the model parameter update amount and topology information of each single-domain control system.

In accordance with a second aspect of the present disclosure, an embodiment provides a method for generating an OTN DT network based on vertical federated learning, applied to a multi-domain orchestration system in an OTN multi-domain physical network system, where the OTN multi-domain physical network system further includes a single-domain control system, and a cross-domain fault root cause identification model of the multi-domain orchestration system and a cross-domain fault root cause identification model of the single-domain control system are of the same structure, the method including: receiving a model parameter update amount generated by the single-domain control system, and generating an OTN DT network based on the model parameter update amount and topology information of each single-domain physical network, where the model parameter update amount is obtained by the single-domain control system by training the cross-domain fault root cause identification model of a corresponding single domain according to a single-domain training set, the single-domain training set is generated by the single-domain control system according to an encrypted fault root cause identifier and an encrypted alarm sample sequence corresponding to the encrypted fault root cause identifier, the encrypted fault root cause identifier is obtained through homomorphic encryption of a fault root cause identifier of the single domain by the single-domain control system, and the encrypted alarm sample sequence is obtained through homomorphic encryption of related alarm information of the single domain by the single-domain control system.

In accordance with a third aspect of the present disclosure, an embodiment provides a single-domain control system, including at least one processor and a memory communicatively connected to the at least one processor, where the memory stores an instruction executable by the at least one processor which, when executed by the at least one processor, causes the at least one processor to implement the method for generating an OTN DT network in accordance with the first aspect.

In accordance with a fourth aspect of the present disclosure, an embodiment provides a multi-domain orchestration system, including at least one processor and a memory communicatively connected to the at least one processor, where the memory stores an instruction executable by the at least one processor which, when executed by the at least one processor, causes the at least one processor to implement the method for generating an OTN DT network in accordance with the second aspect.

In accordance with a fifth aspect of the present disclosure, an embodiment provides an OTN multi-domain physical network system, including the single-domain control system in accordance with the third aspect and the multi-domain orchestration system in accordance with the fourth aspect, where the multi-domain orchestration system is connected to the single-domain control system.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, but are not intended to limit the technical schemes of the present disclosure.

DETAILED DESCRIPTION

Figure 1:
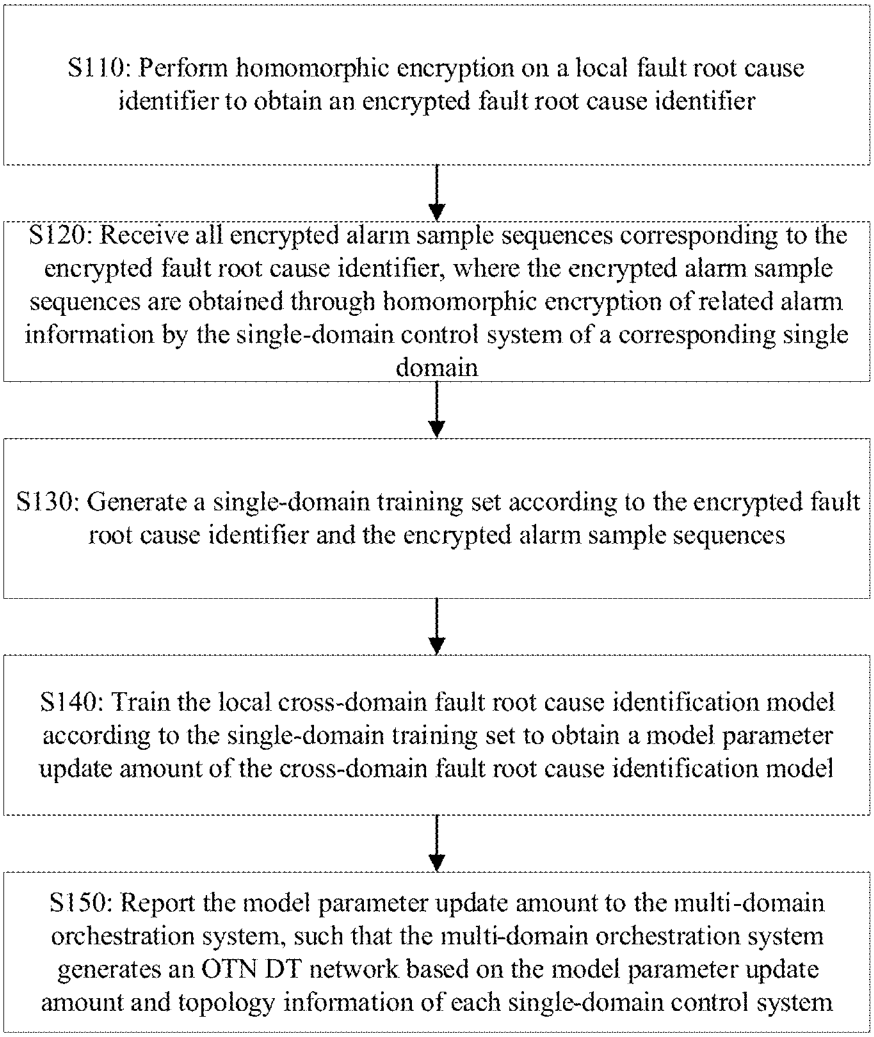
FIG. 1 is an overall flowchart of a method for generating an OTN DT network, which is executed by a single-domain control system, according to an embodiment of the present disclosure.

To make the objects, technical schemes, and advantages of the present disclosure clear, the present disclosure is described in further detail in conjunction with the accompanying drawings and embodiments. It should be understood that the specific embodiments described herein are merely used for illustrating the present disclosure, and are not intended to limit the present disclosure.

The global communications industry is moving from the Internet era and the cloud era to the intelligent era. New opportunities and challenges are driving and accelerating comprehensive network transformation and upgrading. Against this background, TM Forum proposed the concept of Autonomous Networks (ANs) in 2019. After more than 2 years, the AN concept has reached a consensus in the industry, aiming to enable the digital transformation of operator networks through the integration of network technologies and digital technologies, to provide innovative Information and Communications Technology (ICT) services and user experience with zero wait time, zero contact, and zero fault for vertical industries and consumer users, and achieve self-configuration, self-repair, and self-optimization network capabilities for the entire life cycle of operator network operation. At the same time, the emerging DT technology has also entered a period of rapid development and has been widely used in manufacturing, supply chain, and other fields to support industrial digital transformation. Digital transformation in the telecommunications field also has strong demands for DT technologies, which are considered by the industry to be the foundation of digital transformation and an important support and component for realizing AN architectures and technologies. The DT technologies are to establish digital mirror images of internal and external environments through accurate sensing of the states of the internal and external environments, to integrate simulation, prevention, prediction, and other capabilities, and function as key enabling technologies in scenarios such as “low-cost trial and error”, “intelligent decision-making”, and “predictive maintenance”.

When the DT technologies are applied to an operator communication network scenario with an AN system architecture, it is necessary to construct an OTN DT network model and generate an OTN DT network layer in an OTN multi-domain complex network environment to realize the analysis of the entire network OTN through the DT technologies. A DT network layer is a model abstraction of an entire cross-domain OTN physical network. The communication between DT network elements is not restricted by the physical network space, and the visibility and operability of DT network elements are not restricted by spatial restrictions and control restrictions such as physical network domains. Therefore, a functional model of the OTN DT network layer as the cross-domain OTN physical network needs to be capable of globally analyzing the entire cross-domain OTN physical network, and needs to be trained using sample data from various domains. Using the construction of a cross-domain OTN fault root cause identification function model belonging to DT case sensing algorithm model in the cross-domain OTN network layer as an example, supervised learning is generally used to construct a cross-domain OTN fault root cause identification algorithm model. A complete training sample includes an input part (alarms of each domain), an output fault root cause identification value of a Recurrent Neural Network (RNN), and a root cause identifier provided by the domain where the fault root cause is located. In addition, the complexity of collection of the training sample for the cross-domain fault root cause identification model also lies in:

a. uncertainty of occurrence of fault root causes, i.e., fault root causes of different training samples are from different domains: it is likely that a real fault root cause of a training sample occurs in domain A, with a fault root cause identifier provided by domain A, while a real fault root cause of a next training sample occurs in domain B, with a fault root cause identifier provided by domain B; and b. an alarm and a fault root cause identifier belonging to an input part of the same training sample are from different domains, and a single domain needs to obtain related alarm information and fault root cause identifiers provided by other domains in order to obtain a complete training sample, or otherwise the RNN model of this domain cannot be trained.

Therefore, for the training of the cross-domain OTN fault root cause identification model, a control system of a single OTN domain cannot collect a complete training sample from the domain alone and implement the training. If a multi-domain orchestration system that centrally coordinates the single-domain control systems implements central model training, the following problems exist.

1. The collection and processing of a large amount of training data in each single domain increases the computing load of the multi-domain orchestration system, which does not conform to the functional positioning of the multi-domain orchestration system.
2. Each single domain has privacy protection demands for alarms, network topology, user services, and other related data information, and it is not appropriate to open and report all such information to the multi-domain orchestration system in a centralized manner.

To sum up, how to enable each single-domain control system to collect complete training sample data for the cross-domain fault root cause identification model and implement training to enhance the generalization capability of model reasoning, and protect the data privacy of each domain has become a bottleneck of modeling of a cross-domain OTN DT case functional model, and needs to be solved urgently.

In view of the above, embodiments of the present disclosure provide a method and system for generating an OTN DT network, which adopt a vertical federated learning technology to construct training sample data for a cross-domain fault root cause identification model, to protect data privacy and improve the model generalization capability.

Referring to FIG. 1, an embodiment of the present disclosure provides a method for generating an OTN DT network. The OTN DT network is mapped to an OTN multi-domain physical network system including a plurality of single-domain physical networks. The OTN multi-domain physical network system further includes single-domain control systems and a multi-domain orchestration system. Each of the single-domain control systems correspond to one single-domain physical network. A cross-domain fault root cause identification model of the single-domain control system and a cross-domain fault root cause identification model of the multi-domain orchestration system are of the same structure. Steps of a method executed by the single-domain control system and steps of a method executed by the multi-domain orchestration system in the OTN multi-domain physical network system will be respectively described in detail in two parts below.

For any single-domain control system in the OTN multi-domain physical network system, the method includes, but not limited to, the following step S110, S120, S130, S140, and S150.

At S110, homomorphic encryption is performed on a local fault root cause identifier to obtain an encrypted fault root cause identifier.

At S120, all encrypted alarm sample sequences corresponding to the encrypted fault root cause identifier are received, where the encrypted alarm sample sequences are obtained through homomorphic encryption of related alarm information by the single-domain control system of a corresponding single domain.

At S130, a single-domain training set is generated according to the encrypted fault root cause identifier and the encrypted alarm sample sequences.

At S140, the local cross-domain fault root cause identification model is trained according to the single-domain training set to obtain a model parameter update amount of the cross-domain fault root cause identification model.

At S150, the model parameter update amount is reported to the multi-domain orchestration system, such that the multi-domain orchestration system generates an OTN DT network based on the model parameter update amount and topology information of each single-domain control system.

The main architecture of vertical federated learning includes three entities: an entity A, an entity B, and a coordinator C. In an application scenario of vertical federated learning, samples of the entity A and the entity B are from a common data controller. The samples of the data controller have the same ID, but have different feature dimensions. A brief process of vertical federated learning includes the following steps.

At step 1, the coordinator C creates a key pair and sends a public key to the entity A and the entity B.

At step 2, the entity A and the entity B encrypt respective intermediate results and exchange the encrypted intermediate results. The intermediate result is used for calculating a gradient and a loss value.

At step 3, the entity A and the entity B calculate an encryption gradient and add an additional mask. The entity B also calculates an encryption loss. The entity A and the entity B send the respective encrypted results to the coordinator C.

At step 4, the coordinator C decrypts the gradient and loss information and sends a result back to the entity A and the entity B. The entity A and the entity B remove the mask on the gradient information and update a model parameter according to the gradient information.

Figure 2:
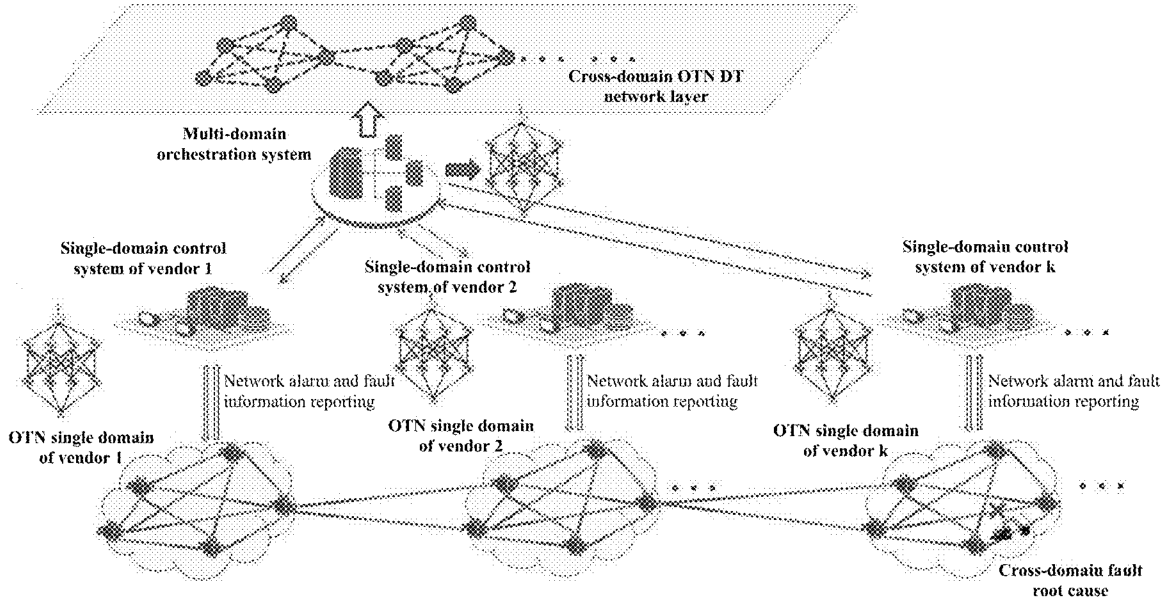
FIG. 2 is an architectural diagram of an OTN multi-domain physical network according to an embodiment of the present disclosure.

Based on vertical federated learning, the scheme of constructing a cross-domain DT network layer based on vertical federated learning in the embodiment of the present disclosure is a homogeneous cross-domain VFML DT modeling scheme. Using the construction of a cross-domain fault root cause identification model of a cross-domain OTN DT case as an example, the structure of an OTN multi-domain physical network is shown in FIG. 2. The OTN multi-domain physical network includes a plurality of single-domain physical networks. The single-domain physical networks may be built based on the same vendor's switching technology or different vendors' switching technologies. Each single-domain physical network is equipped with a single-domain control system (Operations & Maintenance Center, OMC). The single-domain control systems are connected to a multi-domain orchestration system. The multi-domain orchestration system is responsible for outputting a trained cross-domain fault root cause identification model and performing DT modeling based on topology information of the single-domain physical networks. The concept and characteristics of the embodiments of the present disclosure are as follows.

1. Each network element node in a single domain does not have an Artificial Intelligence (AI) training capability, but each single-domain control system has an AI training and modeling capability. The cross-vendor multi-domain orchestration system also has an AI training and modeling capability. Using a cross-domain fault diagnosis and analysis case as a training sample, a fault root cause identifier occurs in domain k, and it is estimated through model training that related input alarms of the root cause identifier are scattered among other domains. The fault root cause identifier and related alarm information in the domains all belong to the cross-domain fault analysis case. Only when the related alarms in the domains and the root cause identifier are all collected, the model training can be implemented, i.e., an application scenario and a training condition required by vertical federated learning are satisfied.
2. In this scheme, the multi-domain orchestration system functions as an edge server. Each single-domain control system performs homomorphic encryption on the model parameter update amount of the cross-domain fault root cause identification model trained by its own AI algorithm and reports the encrypted model parameter update amount to the multi-domain orchestration system. The multi-domain orchestration system decrypts and aggregates the reported model parameter update amounts of all the single-domain control systems, and updates the common model parameter ω f the cross-domain fault root cause identification model constructed by the multi-domain orchestration system.
3. The multi-domain orchestration system broadcasts the updated common model parameter of the cross-domain fault root cause identification model to the single-domain control systems.
4. Each single-domain control system refreshes the parameter of the local cross-domain fault root cause identification model with the common model parameter, and iteratively initiates a next round of model training and interaction with the multi-domain orchestration system.
5. If a communication fault occurs between a single-domain control system and the multi-domain orchestration system or a single-domain control system is faulty, and the single-domain control system cannot upload the model parameter gradient thereof, the multi-domain orchestration system can still update its own common model parameter and interact with other single-domain control systems.
6. By this scheme, related OTN domains can be selected to participate in the training of vertical federated learning according to the batch to which the fault root cause training sample belongs. For example, if the fault root cause identifier of this batch is related to alarms of K OTN domains, the model training and update of this batch occur between the multi-domain orchestration system and the K single-domain control systems. If a fault root cause identifier of a next batch is related to alarms of M OTN domains, the model training and update of this batch occur between the multi-domain orchestration system and the M single-domain control systems. The single-domain control systems participating in the two batches of training may or may not overlap, but the multi-domain orchestration system participates in all batches of cross-domain fault root cause identification model training, thereby ensuring that the trained final cross-domain fault root cause identification common model has a stronger generalization capability and robustness.
7. The multi-domain orchestration system generates the entire cross-domain OTN DT network layer according to the final cross-domain fault root cause identification model obtained by training, encrypted network topology information reported by the domains, and other functional model information.
8. The domains are networked and constructed by different equipment vendors, so the control system of each domain needs to encrypt the parameter update of the cross-domain fault root cause identification model of the domain before reporting the model parameter update amount of the domain. In addition, the local network topology information reported by each domain to the multi-domain orchestration system is also encrypted as needed.
9. The use of vertical federated learning to train a common cross-domain fault root cause identification model requires that an RNN+Softmax (which is used as an example) algorithm model of each single-domain control system has the same structure as an RNN+ Softmax algorithm model of the multi-domain orchestration system that functions as an edge server during training, to ensure the unified training and synchronous refresh of parameters of the RNN+Softmax model. The structure includes the number of vector attributes and vector parameters inputted to the RNN+Softmax model, the number of layers of the RNN+Softmax model, the number of neurons in each layer, an activation function between layers, a connection relationship of the layers, the number of vector attributes and vector parameters outputted, etc.

Figure 3:
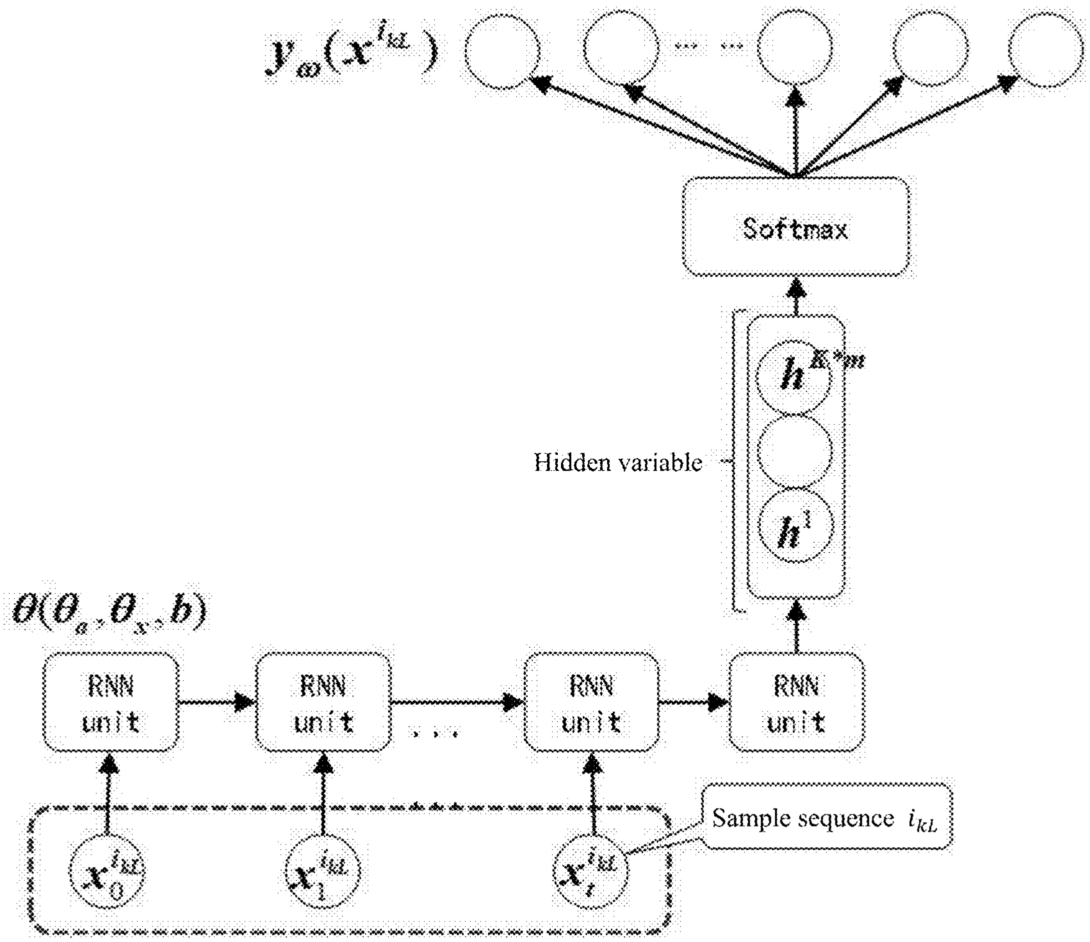
FIG. 3 is an architectural diagram of a cross-domain fault root cause identification model according to an embodiment of the present disclosure.

Referring to FIG. 3, a modeling method according to an embodiment of the present disclosure is as follows.

Using a cross-domain fault root cause identification model of an RNN+Softmax model structure as an example, for a training sample of a batch, each fault root cause training sample based on the supervised learning RNN+ Softmax model includes the following two parts: Input: a cross-domain alarm sample sequence from moments 0 to t; and Output: a fault root cause identifier. In the training of the RNN+Softmax model for cross-domain fault root cause identification, it is assumed that K OTN domains participate in the model training of this batch, each domain has a fault root cause identifier, each domain has related fault alarm information corresponding to a single fault root cause identifier, and the number of fault root cause identifiers in a domain k is defined as $n_{kL}$. When $i_{kL} \in [1, n_{kL}]$, $$x_t^{i_{kL}} = \begin{bmatrix} A_{11t}^{i_{kL}} \\ A_{12t}^{i_{kL}} \\ \cdots \\ A_{1n_At}^{i_{kL}} \\ \cdots \\ A_{K1t}^{i_{kL}} \\ \cdots \\ A_{Kn_At}^{i_{kL}} \end{bmatrix}, f^{i_{kL}} \in [1, K*m], k = 1, 2, 3, \ldots, K$$

where $n_A$ is a positive integer. An input alarm sample vector of the model at moment t corresponding to each fault root cause identifier is obtained by splicing associated alarms of each of all K domains, so $n_A$ represents an upper limit of the number of associated alarms of each domain that are spliced to obtain each input alarm sample vector. Assuming that encrypted alarm sample sequences are all 1-dimensional column vectors, if the number of associated alarms of a domain that are spliced to obtain the alarm sample vector satisfies $n_A<1$, zero-fill processing are performed on other element items.

$f^{i_{kL}}$ represents a scalar value, representing an $$i_{kL}^{th}$$

fault root cause identifier of the domain k. Assuming that K OTN domains participate in the training of this batch, and each domain has m types of fault root causes, the OTN multi-domain fault root cause has a total of K*m values, and the domain where the root cause fault is located and the type of fault root cause can be indicated, i.e., a value range of $f^{i_{kL}}$ can be indicated.

$x^{ikL}$ represents an alarm sample sequence corresponding to the fault root cause identifier $f^{i_{kL}}$ of the domain k.

$$x_t^{i_{kL}}$$

represents an alarm sample of the alarm sample sequence $x^{i_{kL}}$ at moment t, and is expressed in the form of a vector. The vector has a total of $K*n_A$ dimensions of alarm elements, and is composed of alarm elements from the domains. For example, $$A_{11t}^{i_{kL}} \ldots A_{1n_At}^{i_{kL}}$$

represent associated alarm elements from domain 1. Due to the use of zero-fill processing, $x^{i_{kL}}$ is also a 1-dimensional vector.

Referring to a cross-domain fault root cause identification model shown in FIG. 3, an input sample sequence is $$x_t^{i_{kL}},$$

and a fault root cause outputted through the softmax classification layer is $y_\omega(x^{ikL})$ $y_\omega(x^{ikL})$ represents a fault root cause obtained by RNN reasoning based on an $i_{kL}{}^{th}$ alarm sample sequence. The vector form (K*m dimensions) used represents the probabilities of occurrence of various fault root causes. The fault root cause may be "optical fiber aging", "equipment undervoltage", "optical module fault", etc. The corresponding fault alarm information may be "loss of frame (LOF)", "loss of signal (LOS)", "optical power degradation (PD)", etc. $\omega(\omega_1, \omega_2, \omega_3, \ldots, \omega_{K*m}$ represents a parameter vector of the RNN+Softmax model, and $\theta(\theta_\alpha, \theta_\beta, b)$ represents a parameter vector of an RNN model.

From the perspective of AI, in this scheme, a cross-domain fault root cause identification model in a cross-domain OTN DT case constructed by the RNN technology is regarded as a logistic regression model to solve multi-classification problems. If the output of the RNN model is in the form of Softmax, $$y_\omega(x^{i_{kL}}) = \begin{bmatrix} p(f^{i_{kL}} = 1 \mid x^{i_{kL}}; \omega) \\ p(f^{i_{kL}} = 2 \mid x^{i_{kL}}; \omega) \\ \ldots \\ p(f^{i_{kL}} = K*m \mid x^{i_{kL}}; \omega) \end{bmatrix} = \frac{1}{\sum_{j=1}^{K*m} e^{\omega_j^T x^{i_{kL}}}} \begin{bmatrix} e^{\omega_1^T x^{i_{kL}}} \\ e^{\omega_2^T x^{i_{kL}}} \\ \ldots \\ e^{\omega_{K*m}^T x^{i_{kL}}} \end{bmatrix}.$$

A cost function of the OTN cross-domain fault root cause obtained by the RNN model through reasoning based on $n_{kL}$ associated alarm sample sequences $x^{i_{kL}}$ may be expressed by the following formula $$J(\omega) = -\frac{1}{n_{kL}}\left[\sum_{i_{kL}=1}^{n_{kL}} \sum_{j=1}^{K*m} 1\{f^{i_{kL}} = j\} \log \frac{e^{\omega_j^T x^{i_{kL}}}}{\sum_{l=1}^{K*m} e^{\omega_j^T x^{i_{kL}}}}\right]$$

where the $1\{\cdot\}$ operation means that the value is 1 when the expression in braces is true and is 0 when the expression in braces is false.

$\omega(\omega_1, \omega_2, \omega_3, \ldots, (\omega_{K*m})$ may be represented by a K*m -dimensional column vector, and $\omega_j$ represents an RNN model parameter related to a fault root cause value of j.

An objective function for the training of the cross-domain fault root cause identification model of the OTN DT case is:

$$\min_\omega J(\omega).$$

The gradient of the objective function $J(\omega)$ to the RNN model parameter $\omega$ may be expressed as follows, and the training of the RNN model parameter $\omega$ may be implemented using a gradient descent iterative algorithm:

$$\nabla_\omega J(\omega) = \begin{bmatrix} \nabla_{\omega 1} J(\omega) \\ \nabla_{\omega 2} J(\omega) \\ \ldots \\ \nabla_{\omega j} J(\omega) \\ \ldots \\ \nabla_{\omega K*m} J(\omega) \end{bmatrix}_{dim(K*m)}$$

$$\nabla_{\omega j} J(\omega) = -\frac{1}{n_{kL}} \sum_{i_{kL}=1}^{n_{kL}} \left[x^{i_{kL}}\left(1\{f^{i_{kL}} = j\} - p(f^{i_{kL}} = j \mid x^{i_{kL}}; \omega)\right)\right]$$

where $V_{\omega j}J(\omega)$ represents the gradient of the objective function $J(\omega)$ to the RNN model parameter $\omega_j$.

Figure 4:
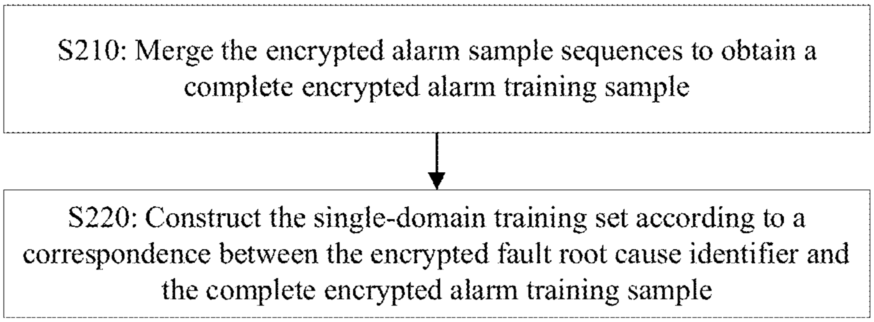
FIG. 4 is a flowchart of constructing a single-domain training set according to an embodiment of the present disclosure.

Referring to FIG. 4, the training set of the cross-domain fault root cause identification model may be constructed by the following steps.

At S210, the encrypted alarm sample sequences are merged to obtain a complete encrypted alarm training sample.

At S220, the single-domain training set is constructed according to a correspondence between the encrypted fault root cause identifier and the complete encrypted alarm training sample.

Based on the mode that the entity A and the entity B encrypt and exchange intermediate data in vertical federated learning, a fault root cause identifier of a single-domain control system and related alarm information of all the other single-domain control systems are homomorphically encrypted and exchanged, to obtain an encrypted fault root cause identifier and encrypted alarm sample sequences corresponding to the encrypted fault root cause identifier, and a single-domain training set is constructed according to the encrypted fault root cause identifier and the encrypted alarm sample sequences. The single-domain training set belongs to the single domain where the fault root cause identifier is located.

Figure 5:
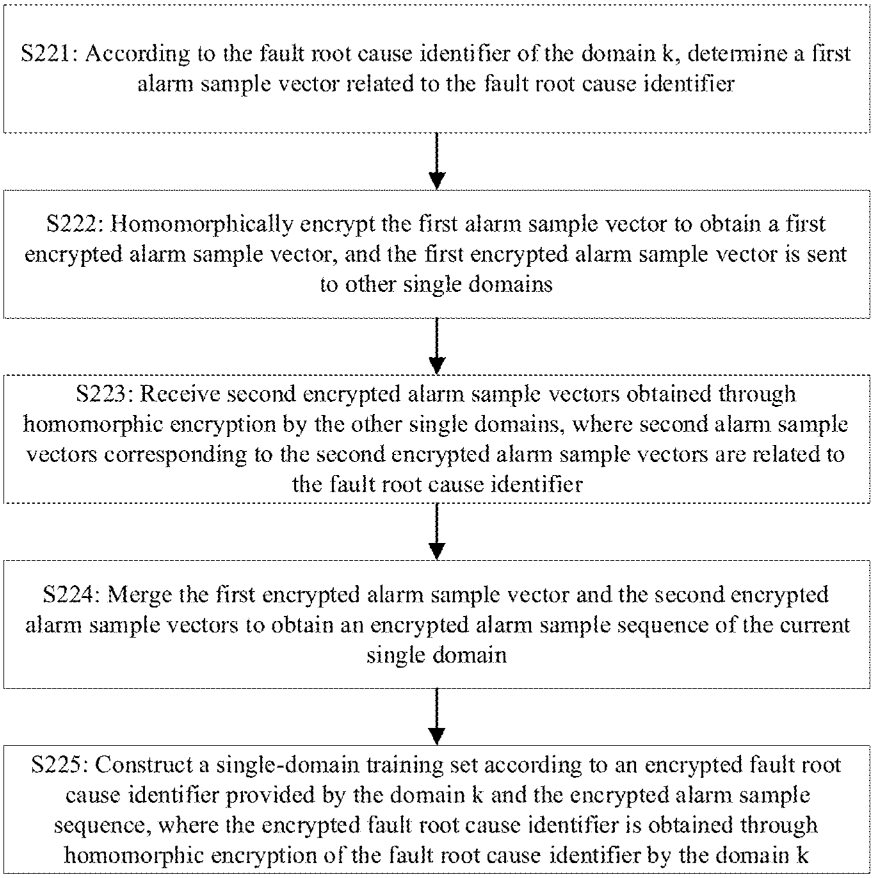
FIG. 5 is a flowchart of constructing a single-domain training set according to a fault root cause identifier and related alarm information according to an embodiment of the present disclosure.

Referring to FIG. 5, assuming that the single domain where the single-domain control system with the fault root cause identifier is located is the domain k, and for any single-domain control system other than the domain k, constructing a single-domain training set of the single domain includes the following steps.

At S221, according to the fault root cause identifier of the domain k, a first alarm sample vector related to the fault root cause identifier is determined.

At S222, the first alarm sample vector is homomorphically encrypted to obtain a first encrypted alarm sample vector, and the first encrypted alarm sample vector is sent to other single domains.

At S223, second encrypted alarm sample vectors obtained through homomorphic encryption by the other single domains are received, where second alarm sample vectors corresponding to the second encrypted alarm sample vectors are related to the fault root cause identifier.

At S224, the first encrypted alarm sample vector and the second encrypted alarm sample vectors are merged to obtain an encrypted alarm sample sequence of the current single domain.

At S225, a single-domain training set is constructed according to an encrypted fault root cause identifier provided by the domain k and the encrypted alarm sample sequence, where the encrypted fault root cause identifier is obtained through homomorphic encryption of the fault root cause identifier by the domain k.

Referring to FIG. 2, using the obtaining of a complete encryption training sample by an OTN single domain 1 of a vendor 1 as an example, it is assumed that a fault root cause identifier of this sample is provided by the domain k.

First, a part, which belongs to alarm information of the domain 1, of an input alarm sample vector of an RNN model corresponding to a fault root cause identifier $f^{i_{kL}}$ at moment t is homomorphically encrypted to obtain a first encrypted alarm sample vector (in this scheme, the encryption sign is represented by en( ) and the decryption sign is represented by deco), and the encrypted alarm vector is sent to other domains.

The first encrypted alarm sample vector is expressed by the following formula:

$$en\left(x_t^{i_{kL}}(1)=\begin{bmatrix}A_{11t}^{i_{kL}}\\A_{12t}^{i_{kL}}\\\cdots\\A_{1n_At}^{i_{kL}}\\0\\0\\\cdots\end{bmatrix}_{dim(K*n_A)}\right)$$

where $$x_t^{i_{kL}}(1)$$

represents the input alarm sample vector of the RNN model corresponding to the fault root cause identifier $f^{i_{kL}}$ in the domain 1 at moment t, and zero-fill processing is performed on the part in the vector that does not belong to alarm information of the domain 1.

Then, from each of the other domains, a homomorphically encrypted part, which belongs to alarm information of the corresponding domain, of an input alarm sample vector of an RNN model corresponding to the fault root cause identifier $f^{i_{kL}}$ at moment t is obtained, and the parts are merged according to a homomorphic encryption merging formula (where the merging formula is f(En(m1),En(m2), . . . ,En(mk))=En(f(m1,m2, . . . ,mk))):

$$en\left(x_t^{i_{kL}}(1)=\begin{bmatrix}A_{11t}^{i_{kL}}\\A_{12t}^{i_{kL}}\\\cdots\\A_{1n_At}^{i_{kL}}\\0\\0\\\cdots\end{bmatrix}_{dim(K*n_A)}\right)+\ldots+en\left(x_t^{i_{kL}}(k_t)=\begin{bmatrix}0\\\cdots\\A_{k1t}^{i_{kL}}\\A_{k2t}^{i_{kL}}\\\cdots\\A_{kn_At}^{i_{kL}}\\0\\0\\\cdots\end{bmatrix}_{dim(K*n_A)}\right)+$$

$$\ldots+en\left(x_t^{i_{kL}}(K_t)=\begin{bmatrix}0\\0\\\cdots\\A_{K1t}^{i_{kL}}\\A_{K2t}^{i_{kL}}\\\cdots\\A_{Kn_At}^{i_{kL}}\end{bmatrix}_{dim(K*n_A)}\right)=en\left(x_t^{i_{kL}}(1)=\begin{bmatrix}A_{11t}^{i_{kL}}\\A_{12t}^{i_{kL}}\\\cdots\\A_{1n_At}^{i_{kL}}\\\cdots\\A_{K1t}^{i_{kL}}\\\cdots\\A_{Kn_At}^{i_{kL}}\end{bmatrix}_{dim(K*n_A)}\right).$$

The above two steps relate to sampling sample sequences at moments 0-t. The sampling moment is adjusted and the above two steps are repeated (assuming that encrypted input alarm sample vectors corresponding to other moments are $$en\left(x_{t'}^{i_{kL}}(1)\right)).$$

Encrypted input alarm sample vectors corresponding to all moments are collected. Finally, a complete encrypted alarm sample sequence en($x^{i_{kL}}$(1)) and an encrypted fault root cause identifier en($f^{i_{kL}}$) provided by the domain k are obtained.

In addition, other domains perform processing similar to the above steps, and each obtain a complete encrypted cross-domain fault root cause identification training sample, i.e., a second encrypted alarm sample vector. According to a similar method, each domain obtains all encrypted cross-domain fault root cause identification training samples. According to the algorithm idea of federated learning, other OTN domains that do not participate in providing input alarms and the fault root cause identifier for $n_{kL}$ samples in this group (i.e., domains other than the K domains) will not participate in the acquisition and exchange of related encrypted training samples, and will not participate in the training and parameter update of the federated learning model for cross-domain fault root cause identification using the $n_{kL}$ samples in this group.

For the cross-domain fault root cause identification model and the constructed single-domain training set, a process of training the cross-domain fault root cause identification model in the cross-domain OTN case is proposed below.

An overall vertical federated learning training process of the RNN+Softmax model for cross-domain fault root cause identification of the multi-domain orchestration system and the RNN model corresponding to each single-domain control system is as follows.

A common model parameter $\omega_0$ of the cross-domain fault root cause identification model of the multi-domain orchestration system is initialized. Let an iteration count k=0. A single-domain training set for cross-domain fault root cause identification whose fault root cause identifier is in a single domain k is collected. The single-domain training set has a total of $n_{kL}$ samples. The cross-domain fault root cause identification models of the multi-domain orchestration system and each single-domain control system are trained using the $n_{kL}$ samples. Each time a round of training is completed, the iteration count is increased by 1, and it is determined whether k exceeds a limit K. If k does not exceed the limit K, the iteration continues. If k exceeds the limit K, the training ends.

Figure 6:
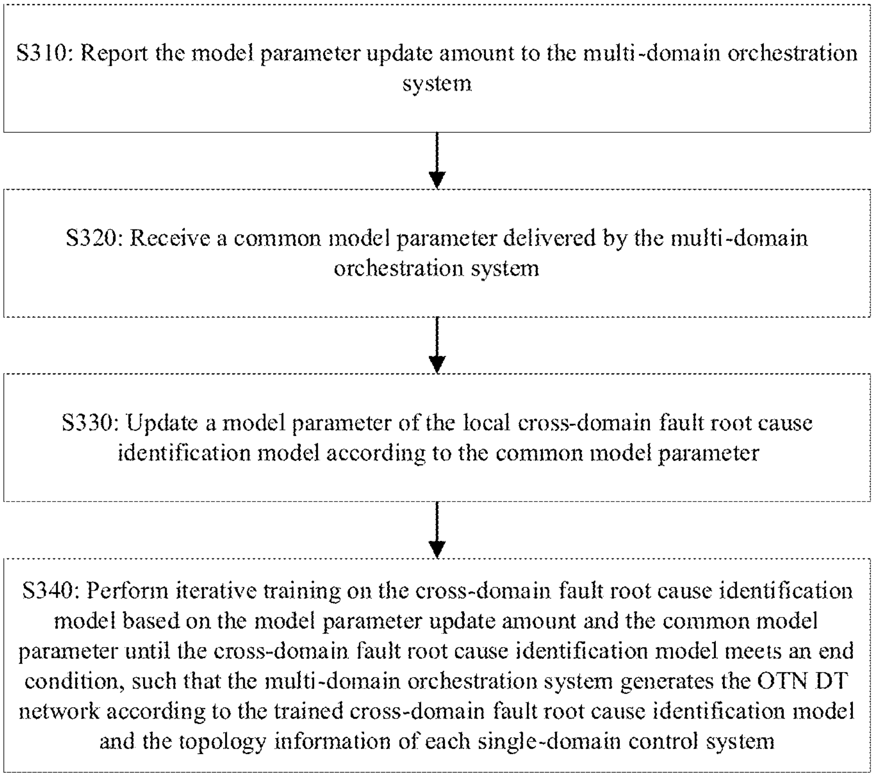
FIG. 6 is a flowchart of an iterative training process according to an embodiment of the present disclosure.

Referring to FIG. 6, the training process of S150 may include the following steps.

At S310, the model parameter update amount is reported to the multi-domain orchestration system.

At S320, a common model parameter delivered by the multi-domain orchestration system is received, where the common model parameter is obtained according to the model parameter update amount and an initial common model parameter, and the initial common model parameter is delivered by the multi-domain orchestration system to the single-domain control system before iterative training.

At S330, a model parameter of the local cross-domain fault root cause identification model is updated according to the common model parameter.

At S340, iterative training is performed on the cross-domain fault root cause identification model based on the model parameter update amount and the common model parameter until the cross-domain fault root cause identification model meets an end condition, such that the multi-domain orchestration system generates the OTN DT network according to the trained cross-domain fault root cause identification model and the topology information of each single-domain control system.

Because the cross-domain fault root cause identification model of each single-domain control system and the cross-domain fault root cause identification model of the multi-domain orchestration system have the same structure, iterative training is performed through the passing of model parameters in the training process. After each training, the single-domain control system calculates a gradient and sends a model parameter update amount to the multi-domain orchestration system. The multi-domain orchestration system determines according to the model parameter update amount whether the cross-domain fault root cause identification model converges, and if not, calculates a new common model parameter according to the model parameter update amount, and delivers the new common model parameter to the single-domain control system. The iteration continues until the cross-domain fault root cause identification model converges.

Figure 7:
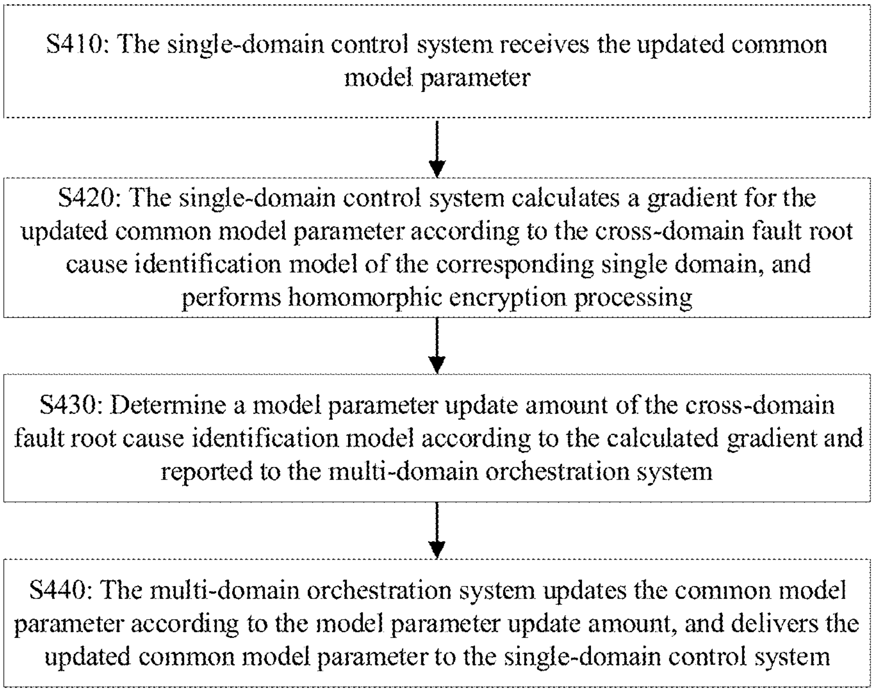
FIG. 7 is a flowchart of a single iteration process executed by a single-domain control system and a multi-domain orchestration system according to an embodiment of the present disclosure.

Referring to FIG. 7, based on the above iterative training process, a single iteration process according to an embodiment of the present disclosure includes the following steps.

At S410, the single-domain control system receives the updated common model parameter.

At S420, the single-domain control system calculates a gradient for the updated common model parameter according to the cross-domain fault root cause identification model of the corresponding single domain, and performs homomorphic encryption processing.

At S430, a model parameter update amount of the cross-domain fault root cause identification model is determined according to the calculated gradient and reported to the multi-domain orchestration system.

At S440, the multi-domain orchestration system updates the common model parameter according to the model parameter update amount, and delivers the updated common model parameter to the single-domain control system.

For the single iteration process, it is assumed that the current iteration count is defined as p, and the current common model parameter of the multi-domain orchestration system is defined as $\omega_p$. The multi-domain orchestration system delivers the common model parameter $\omega_p$ to each single-domain control system. Each single-domain control system calculates a gradient for the common model parameter cop according to the common model parameter to obtain a model parameter update amount, and reports the model parameter update amount to the multi-domain orchestration system. The condition for the multi-domain orchestration system to determine whether the cross-domain fault root cause identification model converges is as follows:

$$\sum_{k=1}^{K} \frac{dec(en(\Delta\omega_p^k))}{K} \to 0.$$

When converged, the iteration ends; when not converged, the common model parameter is updated according to the following formula:

$$\omega_{p+1} = \omega_p + \sum_{k=1}^{K} \frac{dec(en(\Delta\omega_p^k))}{K}.$$

Besides, the iteration count is increased by 1, i.e., changed to p+1, where $\omega_{p+1}$ represents a common model parameter used for a $(P+1)^{th}$ round of iteration. $\omega_{p+1}$ is further delivered to each single-domain control system for the $(P+1)^{th}$ round of iteration.

For the $(P+1)^{th}$ round of iteration, assuming that op has been delivered to each single-domain control system, an interaction process between the multi-domain orchestration system and the single-domain control system (using the single domain 1 as an example) in the $(P+1)^{th}$ round of vertical federated learning training is as follows.

First, a gradient is calculated for $\omega_p$ using a cost function of a cross-domain fault root cause identification model of the single domain 1, and homomorphic encryption processing is performed:

$$en(g_1) = en(\nabla_{\omega 1} J(\omega_p)).$$

Then, a model parameter update amount is calculated, and homomorphically encrypted and reported by the single domain 1 to the multi-domain orchestration system. The model parameter update amount is calculated according to the following formula:

$$en(\Delta\omega_{p+1}^{1}) = en(\omega_{p+1}^{1} - \omega_p) = en(-ag_1).$$

Finally, after obtaining encrypted model parameter update amounts $$en(\Delta\omega_{p+1}^{k})$$

of all single domains including the single domain 1, the multi-domain orchestration system updates the common model parameter $\omega_{p+1}$ of the $(P+1)^{th}$ round by using the above formula for updating the common model parameter and sends the updated common model parameter to each single domain.

$en(g_1)$ represents the encrypted model parameter update amount obtained by gradient calculation, $$en(\Delta\omega_{p+1}^{1})$$

represents the encrypted model parameter update amount of the single domain 1 reported to the multi-domain orchestration system by the control system of the single domain 1 in the $(P+1)^{th}$ round of iteration, and a represents a learning rate.

Figure 8:
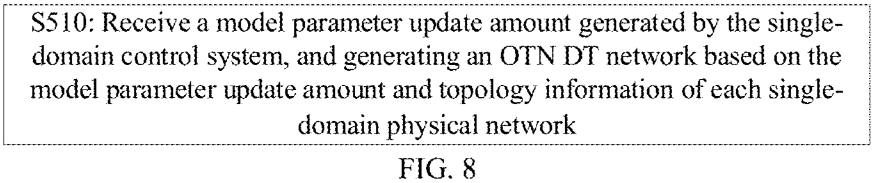
FIG. 8 is an overall flowchart of a method for generating an OTN DT network, which is executed by a multi-domain orchestration system, according to an embodiment of the present disclosure.

Referring to FIG. 8, for the multi-domain orchestration system in the OTN multi-domain physical network system, the method includes, but not limited to, a following step S510.

At S510, a model parameter update amount generated by the single-domain control system is received, and an OTN DT network is generated based on the model parameter update amount and topology information of each single-domain physical network.

The model parameter update amount is obtained by the single-domain control system by training the cross-domain fault root cause identification model of a corresponding single domain according to a single-domain training set, the single-domain training set is generated by the single-domain control system according to an encrypted fault root cause identifier and an encrypted alarm sample sequence corresponding to the encrypted fault root cause identifier, the encrypted fault root cause identifier is obtained through homomorphic encryption of a fault root cause identifier of the single domain by the single-domain control system, and the encrypted alarm sample sequence is obtained through homomorphic encryption of related alarm information of the single domain by the single-domain control system.

Similarly, based the above steps S110 to S150, the multi-domain orchestration system performs iterative training according to the model parameter update amount uploaded by each single-domain control system, and generates an OTN DT network based on a result of the iterative training and topology information of each single-domain physical network.

Figure 9:
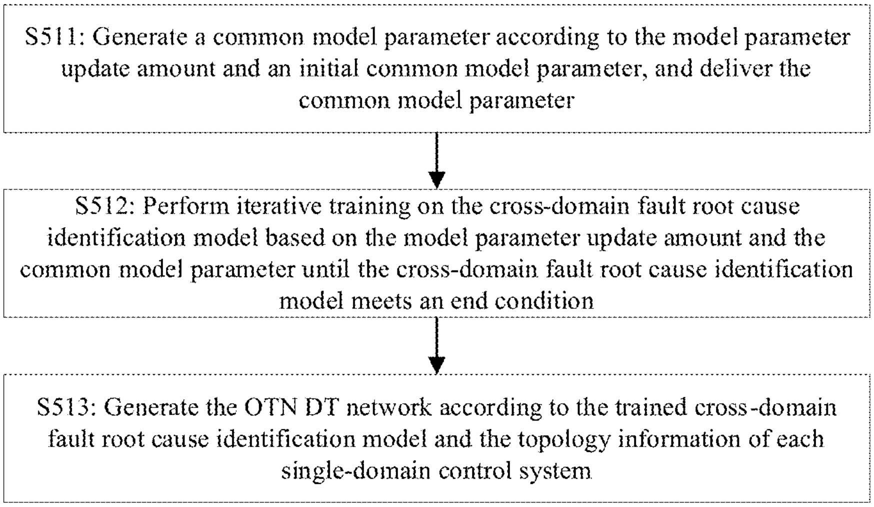
FIG. 9 is a flowchart of an iterative training process according to an embodiment of the present disclosure.

Referring to FIG. 9, generating the OTN DT network by the multi-domain orchestration system through iterative training in S510 may include the following steps.

At S511, a common model parameter is generated according to the model parameter update amount and an initial common model parameter, and the common model parameter is delivered, where the initial common model parameter is delivered by the multi-domain orchestration system to the single-domain control system before iterative training.

At S512, iterative training is performed on the cross-domain fault root cause identification model based on the model parameter update amount and the common model parameter until the cross-domain fault root cause identification model meets an end condition.

At S513, the OTN DT network is generated according to the trained cross-domain fault root cause identification model and the topology information of each single-domain control system.

An end condition of the iterative training of the multi-domain orchestration system is the same as that of the iterative training of the single-domain control system, so the details will not be repeated herein.

With the above scheme, homomorphic encryption is performed on data of single-domain physical networks based on a vertical federated learning technology. A single-domain training set is constructed according to a fault root cause identifier and related alarm information corresponding to the fault root cause identifier. A cross-domain fault root cause identification model is trained using the single-domain training set. Whether the cross-domain fault root cause identification model converges is determined according to a common model parameter and the model parameter update amount during the training. An OTN DT network is generated according to the trained cross-domain fault root cause identification model and topology information of the single-domain physical networks. With the embodiment of the present disclosure, privacy protection demands for alarm information, user service data, and other related data of each single domain in the multi-domain network are satisfied. In addition, when the multi-domain orchestration system serves as an edge server in the OTN multi-domain physical network, the method of the embodiment of the present disclosure allows for the use of computing power of the edge device to implement parallel training, thereby improving the model training efficiency.

It should be noted that the scheme of the embodiment of the present disclosure can not only be applied to an OTN, but also to other homogeneous networks, such as a Packet Transport Network (PTN), a Packet Optical Transport Network (POTN), an Internet Protocol (IP) network, etc. Although the cross-domain fault identification models are all described using the RNN+Softmax structure as an example, in the field of neural network algorithms, the RNN may use multiple variant or alternative algorithms, and the classification layer may use other types of classification algorithms in addition to softmax, which will not be enumerated herein. Those having ordinary skills in the art can select appropriate algorithms to construct the cross-domain fault identification models according to actual situations.

An embodiment of the present disclosure provides a single-domain control system, including at least one processor and a memory communicatively connected to the at least one processor, where the memory stores an instruction executable by the at least one processor which, when by the at least one processor, causes the at least one processor to implement the method for generating an OTN DT network from the perspective of the single-domain control system.

An embodiment of the present disclosure provides a multi-domain orchestration system, including at least one processor and a memory communicatively connected to the at least one processor, where the memory stores an instruction executable by the at least one processor which, when executed by the at least one processor, causes the at least one processor to implement the method for generating an OTN DT network from the perspective of the multi-domain orchestration system.

An embodiment of the present disclosure provides an OTN multi-domain physical network system, including the single-domain control system and the multi-domain orchestration system that execute the method for generating an OTN DT network. The single-domain control system and the multi-domain orchestration system are connected to exchange data.

The method for generating an OTN DT network provided in the embodiments of the present disclosure at least has the following beneficial effects. Homomorphic encryption is performed on data of single-domain physical networks through vertical federated learning. The encrypted data is exchanged. A single-domain training set is constructed according to a fault root cause identifier and related alarm information corresponding to the fault root cause identifier. A cross-domain fault root cause identification model is trained using the single-domain training set. Whether the cross-domain fault root cause identification model converges is determined according to a common model parameter and the model parameter update amount during the training. An OTN DT network is generated according to the trained cross-domain fault root cause identification model and topology information of the single-domain physical networks. With the embodiment of the present disclosure, privacy protection demands for alarm information, user service data, and other related data of each single domain in the multi-domain network are satisfied. In addition, when the multi-domain orchestration system serves as an edge server in the OTN multi-domain physical network, the method of the embodiment of the present disclosure allows for the use of computing power of the edge device to implement parallel training, thereby improving the model training efficiency.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a compact disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present disclosure have been described above, the present disclosure is not limited to the implementations described above. Those having ordinary skills in the art can make various equivalent modifications or replacements without departing from the essence of the present disclosure. Such equivalent modifications or replacements fall within the scope defined by the claims of the present disclosure.

What is claimed is:

1. A method for generating an Optical Transport Network (OTN) Digital Twin (DT) network based on vertical federated learning, applied to a single-domain control system in an OTN multi-domain physical network system, wherein the OTN multi-domain physical network system further comprises a multi-domain orchestration system, and a cross-domain fault root cause identification model of the multi-domain orchestration system and a cross-domain fault root cause identification model of the single-domain control system are of the same structure, the method comprising:

performing homomorphic encryption on a local fault root cause identifier to obtain an encrypted fault root cause identifier;

receiving all encrypted alarm sample sequences corresponding to the encrypted fault root cause identifier, wherein the encrypted alarm sample sequences are obtained through homomorphic encryption of related alarm information by the single-domain control system of a corresponding single domain;

generating a single-domain training set according to the encrypted fault root cause identifier and the encrypted alarm sample sequences;

training the local cross-domain fault root cause identification model according to the single- domain training set to obtain a model parameter update amount of the cross-domain fault root cause identification model; and reporting the model parameter update amount to the multi-domain orchestration system, such that the multi-domain orchestration system generates an OTN DT network based on the model parameter update amount and topology information of each single-domain control system.

2. The method for generating an OTN DT network of claim 1, wherein each of the encrypted alarm sample sequences is a 1-dimensional column vector, and zero-fill processing is performed for element items in the encrypted alarm sample sequence except element items of the related alarm information.

3. The method for generating an OTN DT network of claim 2, wherein generating a single-domain training set according to the encrypted fault root cause identifier and the encrypted alarm sample sequences comprises:

merging the encrypted alarm sample sequences to obtain a complete encrypted alarm training sample; and constructing the single-domain training set according to a correspondence between the encrypted fault root cause identifier and the complete encrypted alarm training sample.

4. The method for generating an OTN DT network of claim 1, wherein reporting the model parameter update amount to the multi-domain orchestration system, such that the multi-domain orchestration system generates an OTN DT network based on the model parameter update amount and topology information of each single-domain control system comprises:

reporting the model parameter update amount to the multi-domain orchestration system;

receiving a common model parameter delivered by the multi-domain orchestration system, wherein the common model parameter is obtained according to the model parameter update amount and an initial common model parameter, and the initial common model parameter is delivered by the multi-domain orchestration system to the single-domain control system before iterative training;

updating a model parameter of the local cross-domain fault root cause identification model according to the common model parameter; and performing iterative training on the cross-domain fault root cause identification model based on the model parameter update amount and the common model parameter until the cross-domain fault root cause identification model meets an end condition, such that the multi-domain orchestration system generates the OTN DT network according to the trained cross-domain fault root cause identification model and the topology information of each single-domain control system.

5. The method for generating an OTN DT network of claim 4, wherein the end condition of the iterative training of the cross-domain fault root cause identification model is:

$$\sum_{k=1}^{K} \frac{dec\left(en\left(\Delta\omega_p^k\right)\right)}{K} \to 0$$

wherein K represents a number of single domains, en( ) represents a homomorphic encryption operator, dec( ) represents an operator of decrypting a homomorphically encrypted public key, and $$\Delta\omega_p^k$$

represents a model parameter update amount of a $k^{th}$ single domain in a $p^{th}$ iteration.

6. The method for generating an OTN DT network of claim 5, wherein in response to the iterative training of the cross-domain fault root cause identification model not meeting the end condition, the common model parameter is updated to:

$$\omega_{p+1} = \omega_p + \sum_{k=1}^{K} \frac{dec\left(en\left(\Delta\omega_p^k\right)\right)}{K}$$

wherein $\omega_{p+1}$ is a common model parameter for a $(P+1)^{th}$ iteration.

7. The method for generating an OTN DT network of claim 1, wherein before the topology information is reported, the method further comprises:

performing encryption processing on the topology information.

8. A method for generating an Optical Transport Network (OTN) Digital Twin (DT) network based on vertical federated learning, applied to a multi-domain orchestration system in an OTN multi-domain physical network system, wherein the OTN multi-domain physical network system further comprises a single-domain control system, and a cross-domain fault root cause identification model of the multi-domain orchestration system and a cross-domain fault root cause identification model of the single-domain control system are of the same structure, the method comprising:

receiving a model parameter update amount generated by the single-domain control system, and generating an OTN DT network based on the model parameter update amount and topology information of each single-domain physical network, wherein the model parameter update amount is obtained by the single-domain control system by training the cross-domain fault root cause identification model of a corresponding single domain according to a single-domain training set, the single-domain training set is generated by the single-domain control system according to an encrypted fault root cause identifier and an encrypted alarm sample sequence corresponding to the encrypted fault root cause identifier, the encrypted fault root cause identifier is obtained through homomorphic encryption of a fault root cause identifier of the single domain by the single-domain control system, and the encrypted alarm sample sequence is obtained through homomorphic encryption of related alarm information of the single domain by the single-domain control system.

9. The method for generating an OTN DT network of claim 8, wherein generating an OTN DT network based on the model parameter update amount and topology information of each single-domain physical network comprises:

generating a common model parameter according to the model parameter update amount and an initial common model parameter, and delivering the common model parameter, wherein the initial common model parameter is delivered by the multi-domain orchestration system to the single-domain control system before iterative training;

performing iterative training on the cross-domain fault root cause identification model based on the model parameter update amount and the common model parameter until the cross-domain fault root cause identification model meets an end condition; and generating the OTN DT network according to the trained cross-domain fault root cause identification model and the topology information of each single-domain control system.

10. The method for generating an OTN DT network of claim 9, wherein the end condition of the iterative training of the cross-domain fault root cause identification model is:

$$\sum_{k=1}^{K} \frac{dec\left(en\left(\Delta\omega_p^k\right)\right)}{K} \to 0$$

wherein K represents a number of single domains, en( ) represents a homomorphic encryption operator, dec( ) represents an operator of decrypting a homomorphically encrypted public key, and $$\Delta\omega_p^k$$

represents a model parameter update amount of a $k^{th}$ single domain in a $p^{th}$ iteration.

11. The method for generating an OTN DT network of claim 10, wherein in response to the iterative training of the cross-domain fault root cause identification model not meeting the end condition, the common model parameter is updated to:

$$\omega_{p+1} = \omega_p + \sum_{k=1}^{K} \frac{dec(en(\Delta\omega_p^k))}{K}$$

wherein $\omega_{p+1}$ is a common model parameter for a $(P+1)^{th}$ iteration.

12. The method for generating an OTN DT network of claim 8, wherein the cross-domain fault root cause identification model comprises a plurality of Recurrent Neural Network (RNN) units and a softmax classification layer.

13. A single-domain control system, comprising at least one processor and a memory communicatively connected to the at least one processor, wherein the memory stores an instruction executable by the at least one processor which, when executed by the at least one processor, causes the at least one processor to perform the method for generating an OTN DT network of claim 1.

14. A multi-domain orchestration system, comprising at least one processor and a memory communicatively connected to the at least one processor, wherein the memory stores an instruction executable by the at least one processor which, when executed by the at least one processor, causes the at least one processor to perform the method for generating an OTN DT network of claim 8.

15. An Optical Transport Network (OTN) multi-domain physical network system, comprising a single-domain control system and a multi-domain orchestration system, wherein, the multi-domain orchestration system is connected to the single-domain control system, a cross-domain fault root cause identification model of the multi-domain orchestration system and a cross-domain fault root cause identification model of the single-domain control system are of the same structure;

the single-domain control system comprises at least one processor and a memory communicatively connected to the at least one processor, the memory stores an instruction executable by the at least one processor which, when executed by the at least one processor, causes the at least one processor to perform a method for generating an OTN Digital Twin (DT) network based on vertical federated learning, the method comprises:

performing homomorphic encryption on a local fault root cause identifier to obtain an encrypted fault root cause identifier;

receiving all encrypted alarm sample sequences corresponding to the encrypted fault root cause identifier, wherein the encrypted alarm sample sequences are obtained through homomorphic encryption of related alarm information by the single-domain control system of a corresponding single domain;

generating a single-domain training set according to the encrypted fault root cause identifier and the encrypted alarm sample sequences;

training the local cross-domain fault root cause identification model according to the single-domain training set to obtain a model parameter update amount of the cross-domain fault root cause identification model; and reporting the model parameter update amount to the multi-domain orchestration system, such that the multi-domain orchestration system generates an OTN DT network based on the model parameter update amount and topology information of each single-domain control system; and the multi-domain orchestration system comprises at least one processor and a memory communicatively connected to the at least one processor, wherein the memory stores an instruction executable by the at least one processor which, when executed by the at least one processor, causes the at least one processor to perform a method for generating an OTN DT network based on vertical federated learning, the method comprises:

receiving a model parameter update amount generated by the single-domain control system, and generating an OTN DT network based on the model parameter update amount and topology information of each single-domain physical network, wherein the model parameter update amount is obtained by the single-domain control system by training the cross-domain fault root cause identification model of a corresponding single domain according to a single-domain training set, the single-domain training set is generated by the single-domain control system according to an encrypted fault root cause identifier and an encrypted alarm sample sequence corresponding to the encrypted fault root cause identifier, the encrypted fault root cause identifier is obtained through homomorphic encryption of a fault root cause identifier of the single domain by the single-domain control system, and the encrypted alarm sample sequence is obtained through homomorphic encryption of related alarm information of the single domain by the single-domain control system.

* * * * *